United States Patent [19]
Ohmi et al.

[11] Patent Number: 5,711,197
[45] Date of Patent: Jan. 27, 1998

[54] TUBE FACING MACHINE

[75] Inventors: Tadahiro Ohmi, Sendai; Eiji Ideta; Akihiro Morimoto, both of Osaka, all of Japan

[73] Assignee: Fujikin Inc, Osaka, Japan

[21] Appl. No.: 627,549

[22] Filed: Apr. 4, 1996

[30] Foreign Application Priority Data

Apr. 21, 1995 [JP] Japan ................................ 7-096423

[51] Int. Cl.$^6$ ................................................ B23B 5/16
[52] U.S. Cl. ........................................ 82/113; 408/104
[58] Field of Search .......................... 82/1.2, 1.4, 113; 407/42; 408/103, 104, 186, 233, 713

[56] References Cited

U.S. PATENT DOCUMENTS

| | | | |
|---|---|---|---|
| 3,848,489 | 11/1974 | Santana | 86/61 |
| 3,868,752 | 3/1975 | Hopkins | 407/42 |
| 4,114,484 | 9/1978 | Feamster, III | 82/113 |
| 4,319,503 | 3/1982 | Saine et al. | 82/4 C |
| 5,351,587 | 10/1994 | Griffin | 82/113 |
| 5,393,176 | 2/1995 | Waring | 82/113 |

*Primary Examiner*—Daniel W. Howell
*Attorney, Agent, or Firm*—Armstrong, Westerman, Hattori, McLeland & Naughton

[57] ABSTRACT

A cutter for facing ends of tubes has a cutting edge perpendicular to the axis of a drive shaft and extending obliquely from a plane containing a reference side face of the cutter. The cutter has a base end portion fitted in a cutter mount groove which is defined by a reference side face a specified distance away from the drive shaft axis. The cutter is positioned as shifted a predetermined distance along the length of the groove, with the cutter reference side face bearing on the groove-defining reference side face, whereby the cutter is adapted to cut the tube end in a direction a predetermined angle outward with respect to a tangential direction of the tube at the cutting position.

4 Claims, 5 Drawing Sheets

TUBE FACING MACHINE

BACKGROUND OF THE INVENTION

The present invention relates to a tube facing machine for facing cut ends of tubes at right angles with the axis of the tube to facilitate the subsequent treatment such as welding.

FIGS. 7 and 8 show a tube facing machine already known for squaring ends of tubes for facilitated welding (see U.S. Pat. No. 4,319,503). With reference to FIG. 7, the tube facing machine comprises a hollow cylindrical body 1 extending longitudinally of the machine, a sleeve 2 slidably disposed inside the body 1, a sleeve sliding side handle 3 provided on the outer side of the body 1, a cutter rotating drive shaft 4 rotatably supported by the sleeve 3 inside thereof, a cutter 11 attached to the front end of the drive shaft 4 for cutting the rear end of a tube T to be faced, a cam 5 in engagement with the sleeve 2 for converting the rotation of the side handle 3 to a sliding movement of the sleeve 2, a fixed ring 6 projecting forward from the front end of the body 1 and having a rearwardly tapered inner periphery 6a, a collet 7 inserted in the fixed ring 6 for holding the tube T so that the axis of the tube T is aligned with the axis 15 of the drive shaft 4, and a collet fastening ring 8. Provided at the front end of the drive shaft 4 is a solid cylindrical cutter mount 9 coaxial with, and having a larger diameter than, the shaft. A rectangular parallelepipedal base end portion 12 of the cutter 11 is fitted in a cutter mount groove 10 formed in the front end of the cutter mount 9. The cutter 11 has a prismatic portion 11a extending forward from the base end portion 12. The prismatic portion 11a is formed at its front end with a cutting edge 13 at right angles with the axis 15 of the drive shaft 4.

With reference to FIG. 8, the cutter mount groove 10 extends approximately diametrically of the mount 9 and is defined by a reference side face 10a containing the axis 15 of the drive shaft 4 and an opposed side face 10b parallel to the side face 10a. The base end portion 12 of the cutter 11 has a reference side face 12a bearing on the groove-defining reference side face 10a and pressed against the side face 10a by screws 14 driven into the side portion of the mount 9 having the opposed side face 10b. The cutting edge 13 of the cutter 11 is positioned radially of the tube T, and the cutter 11 is rotated counterclockwise in the drawing.

The conventional tube facing machine described has the problem that chips enter the tube during cutting, rotating in the interior of the tube with the rotation of the cutter to deface the tube inner surface. If the tube is internally defaced, dirt will accumulate therein or impaired corrosion resistance will result. The result is especially serious in the case of tubes of small diameter, such as tubes for use in preparing semiconductors, which must retain extreme cleanliness.

SUMMARY OF THE INVENTION

An object of the present invention is to provide a tube facing machine which is unlikely to internally deface tubes.

The present invention provides a tube facing machine which comprises a hollow cylindrical body extending longitudinally of the machine, a cutter rotating drive shaft disposed inside the body, a cutter attached to a front end portion of the drive shaft for facing an end of a tube, means for holding the tube in front of the cutter so as to align the axis of the tube with the axis of the drive shaft, and means for moving the drive shaft longitudinally of the machine, the tube facing machine being characterized in that the cutter is so fixed that the cutting direction thereof is a predetermined angle outward with respect to a tangential direction of the tube at the position of cutting.

With the tube facing machine embodying the invention, the cutter is so fixed that the cutting direction thereof is a predetermined angle outward with respect to a tangential direction at the cutting position. The chips produced by cutting, i.e., facing, are therefore sent outward without entering the tube, and the burrs projecting from the tube inner periphery are small. Being sent outward without ingressing into the tube, the chips are unlikely to deface the tube inner periphery. Further because the burrs projecting from the tube inner periphery are diminished, the interior of the tube is kept very clean.

The angle the cutter cutting direction makes with the tangential direction at the cutting position is preferably 10 to 40 degrees, more preferably 20 to 30 degrees. If this angle is smaller, chips are likely to enter the tube, whereas larger angles impair the life of the cutter.

Preferably, the front end portion of the drive shaft is formed with a cutter mount groove defined by a reference side face, the cutter is formed on a base end portion thereof with a reference side face bearing on the groove-defining reference side face, and a cutting edge is formed at a front end of the cutter. Further preferably, the cutting edge extends from a plane containing the reference side face of the cutter base end portion, and the groove-defining reference side face is positioned a specified distance away from the axis of the drive shaft.

The range in which the angle between the cutter cutting direction and the tangential direction at the cutting position is adjustable is then determined by adjusting the distance of the reference side face defining the cutter mount groove from the axis of the drive shaft, and the angle is finely adjusted by moving the cutter longitudinally of the mount groove with the cutter base end portion in bearing contact with the groove-defining reference side face. Because the adjustable angular range is thus determinable by adjusting the above-mentioned distance and because the angle is finely adjustable by moving the cutter in this way, the cutting direction of the cutter can be readily made outward by a specified angle even when tubes of small diameter are to be cut for facing.

DESCRIPTION OF THE PREFERRED EMBODIMENT

Figure 1:
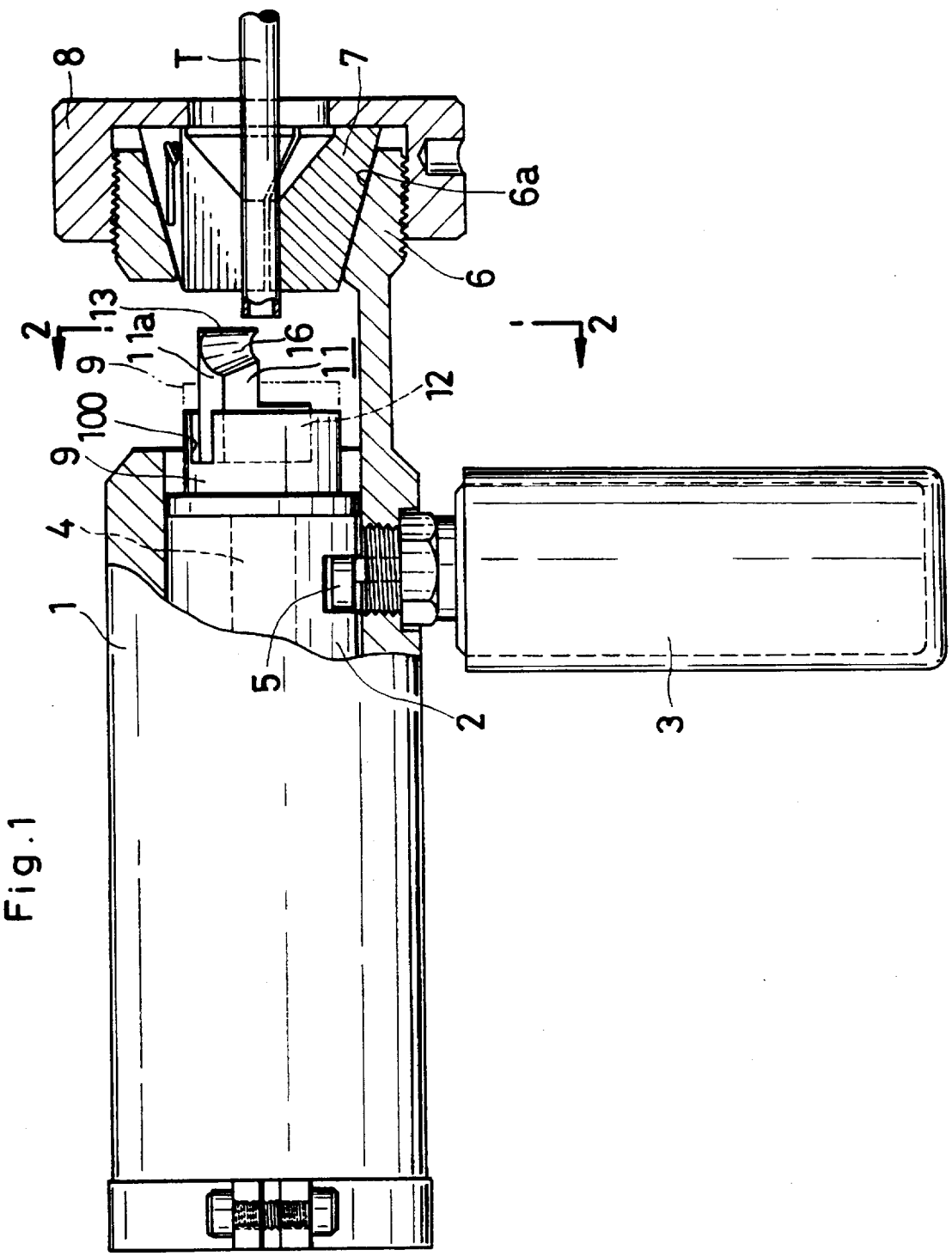
FIG. 1 is a side elevation partly broken away and showing a tube facing machine of the invention.

An embodiment of the present invention will be described below with reference to the drawings concerned. The terms "front" and "rear" are herein used based on FIG. 1; the right-hand side of the drawing is referred to as "front," and the left-hand side thereof as "rear."

Figure 2:
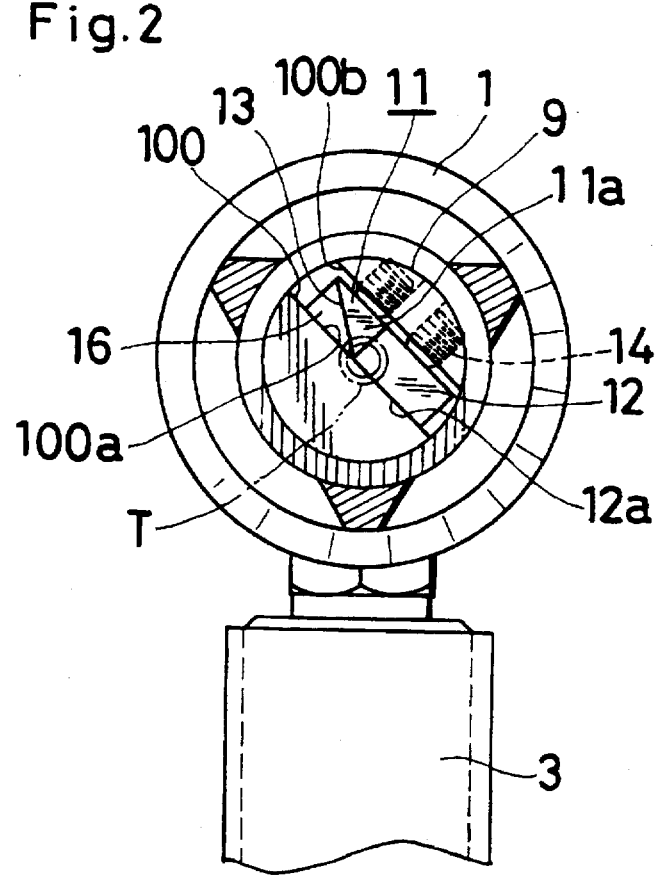
FIG. 2 is a view in section taken along the line 2—2 in FIG. 1.

With reference to FIGS. 1 and 2 showing a tube facing machine embodying the invention, the machine comprises a hollow cylindrical body 1 extending longitudinally of the machine, a sleeve 2 slidably disposed inside the body 1, a sleeve sliding side handle 3 provided on the outer side of the body 1, a cutter rotating drive shaft 4 rotatably supported by the sleeve 2 inside the cylindrical body 1, a cutter 11 attached to the front end of the drive shaft 4 for cutting the rear end of a tube T to be faced, a cam 5 in engagement with the sleeve 2 for converting the rotation of the slide handle 3 to a sliding movement of the sleeve 2, a fixed ring 6 projecting forward from the front end of the body 1 and having a rearwardly tapered inner periphery 6a, a collet 7 inserted in the fixed ring 6 for holding the tube T so that the axis of tie tube T is aligned with the axis 15 of the drive shaft 4, and a collet fastening ring 8. Provided at the front it end of the drive shaft 4 is a solid cylindrical cutter mount 9 coaxial with the shaft and having a larger diameter than the shaft. A rectangular parallelepipedal base end portion 12 of the cutter 11 is fitted in a cutter mount groove 100 formed in the front end of the cutter mount 9. The cutter 11 has a prismatic portion 11a extending forward from the base end portion 12 and is L-shaped when seen from one side and rectangular when seen from the front. The prismatic portion 11a has a front end face perpendicular to the axis 15 of the drive shaft 4. A cutting face 16 approximately triangular when seen from the front is formed in the front end part of the prismatic portion 11a, whereby a cutting edge 13 is formed at the front end of the prismatic portion 11a, the cutting edge 13 being at right angles with the axis 15 of the drive shaft 4 and extending obliquely from a plane containing a reference side face 12a of the base end portion 12. The cutter mount groove 100 extends approximately diametrically of the cutter mount 9 and is defined by a reference side face 100a and an opposed side face 100b parallel to the face 100a. The base end portion 12 of the cutter 11 is fixedly pressed against the groove-defining reference side face 100a by screws 14 driven into the side portion of the mount 9 having the opposed side face 100b, with the reference side face 12a bearing on the reference side face 100a. The cutter 11 is rotated counterclockwise in FIG. 2.

Figure 3:
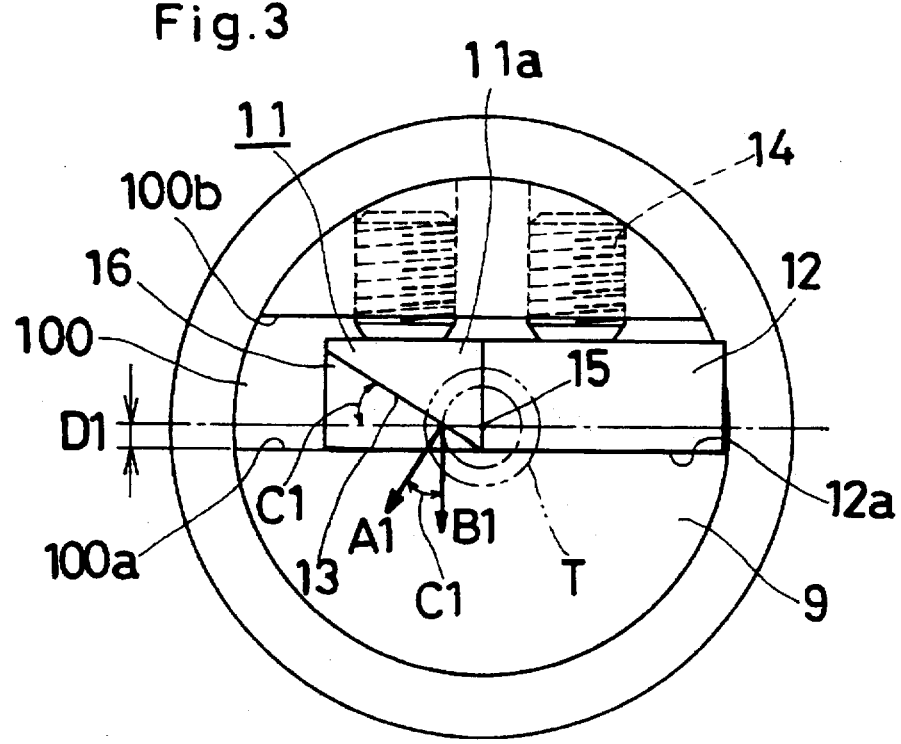
FIG. 3 is a front view of a cutter fixed to a cutter mount.
Figure 8:
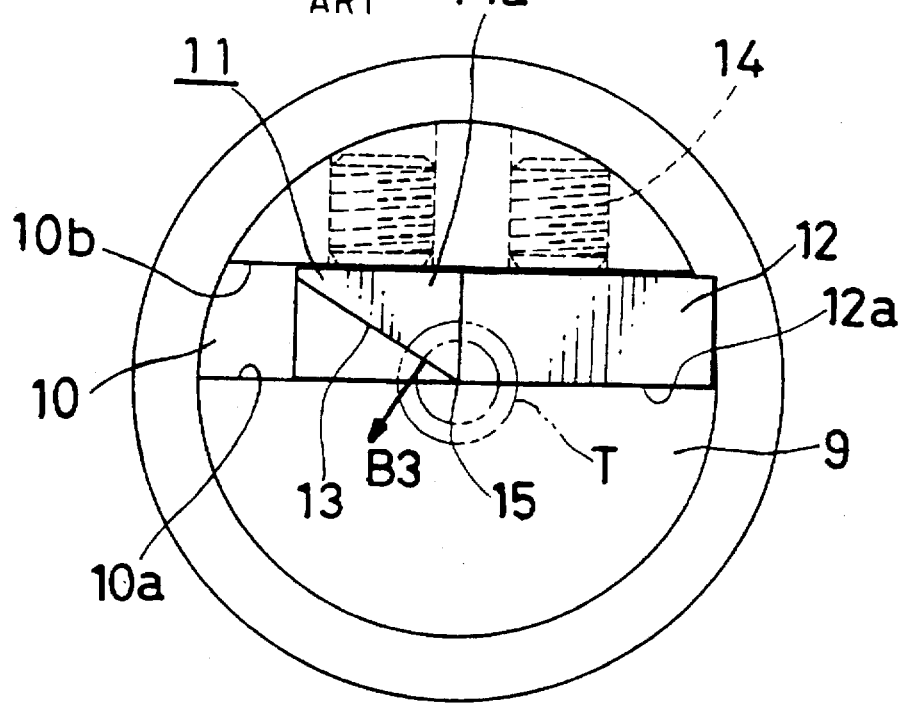
FIG. 8 is a front view of a cutter included in the conventional machine and fixed to a cutter mount.

The cutter mount groove 100 of the tube facing machine of the invention differs in shape from the groove 10 of the conventional machine. Stated more specifically with reference to FIG. 8, the reference side face 10a of the conventional cutter mount groove 10 contains the axis 15 of the drive shaft 4, whereas the groove 100 of the present machine is so shaped that the axis 15 of the drive shaft 4 is positioned between the reference side face 100a and the opposed side face 100b as shown in FIG. 3. The cutter mount groove 100 can be readily formed by cutting the reference side face 10a of the conventional cutter mount groove 10 by a specified distance D1.

With the conventional tube facing machine, the cutting edge 13 of the cutter 11 extends radially of the tube T, and chips are sent in a tangential direction B3 of the tube T and are therefore very likely to enter the tube T, while large burrs project from the inner periphery of the tube T. When ingressing into the tube T, the chips rotate with the rotation of the cutter 11 in the interior of the tube T, giving rise to the problem of internally defacing the tube.

With the tube facing machine embodying the invention, on the other hand, the cutter 11 is mounted as shifted by the specified distance D1 from the axis 15 of the drive shaft 4, with the result that the cutting edge 13 of the cutter 11 is not in coincidence with a radial direction of the tube T but intersects the radial direction at an angle C1. More specifically, the cutting direction A1 of the cutting edge 13 is an angle C1 outward with respect to a tangential direction B1 of the tube T at the cutting position. Accordingly, the chips are sent outward without entering the tube T, while the burrs projecting from the inner periphery of the tube T are small. The small burrs projecting from the inner periphery melt during welding and therefore need not be removed. Although slightly larger burrs than conventionally project from the tube outer periphery, these burrs pose no problem since they are formed on the outer periphery.

The cutting edge 13 may be positioned as projected beyond the reference side face 10a defining the conventional cutter mount groove 10 by cutting the reference side face 12a of the base end portion 12 of the cutter 11 instead of cutting the reference side face 10a by the specified distance D1.

Figure 4:
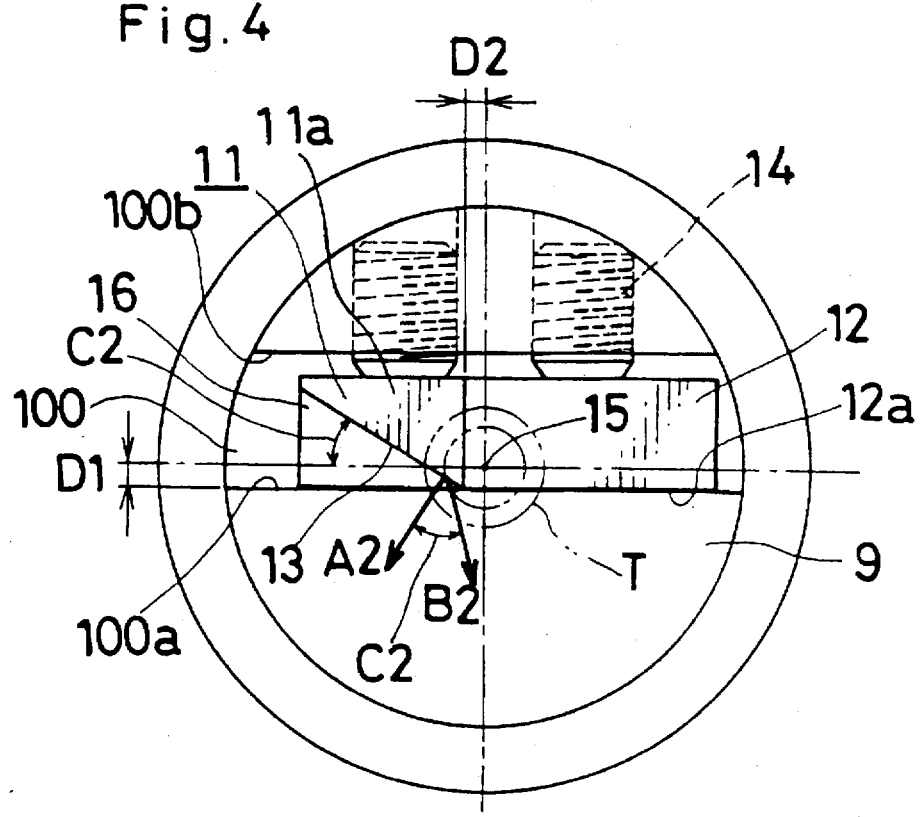
FIG. 4 is a front view of the cutter fixed, as shifted from the position in FIG. 3, to the cutter mount.

Although the angle C1 of the cutting direction A1 of the cutting edge 13 makes with the tangential direction B1 of the tube T at the cutting position varies with the distance D1 of the reference side face 100a defining the mount groove 100 from the axis 15 of the drive shaft 4, the angle is preferably 10 to 40 degrees, more preferably 20 to 30 degrees, most preferably about 25 degrees. If the angle C1 is smaller, there is the possibility of the chips entering the tube T, whereas larger angles impair the life of the cutter 11. With reference to FIG. 4, the angle C2 the cutting direction A2 of the cutting edge 13 makes with a tangential direction B2 of the tube T at the cutting position is slightly variable by moving the cutter 11 a distance D2 longitudinally of the cutter mount groove 100. In FIG. 4, the cutting direction A2 of the cutting edge 13 is an angle C2 outward with respect to the tangential direction B2 of the tube T at the cutting position, and this arrangement achieves the same effect as that shown in FIG. 3. The most preferable angle is available by so adjusting the distance D2 of movement that the angle C2 becomes 25 degrees. The range in which the angle C1 or C2 between the cutting direction of the cutter 11 and the tangential direction at the cutting position is adjustable is determined by the distance D1 of the reference side face 100a defining the mount groove 100 from the axis 15 of the drive shaft 4, and the angle is further finely adjusted by moving the cutter 11 longitudinally of the mount groove 100. Without depending on the distance D1 between the drive shaft axis 15 and the groove-defining reference side face 100a or on the diameter of teh tube T but by moving the cutter 11 along the length of the cutter mount groove 100, it becomes possible to cut the tube end with the base portion of the cutter 13 which has an increased strength. This gives improved durability to the cutter 11.

Figure 5:
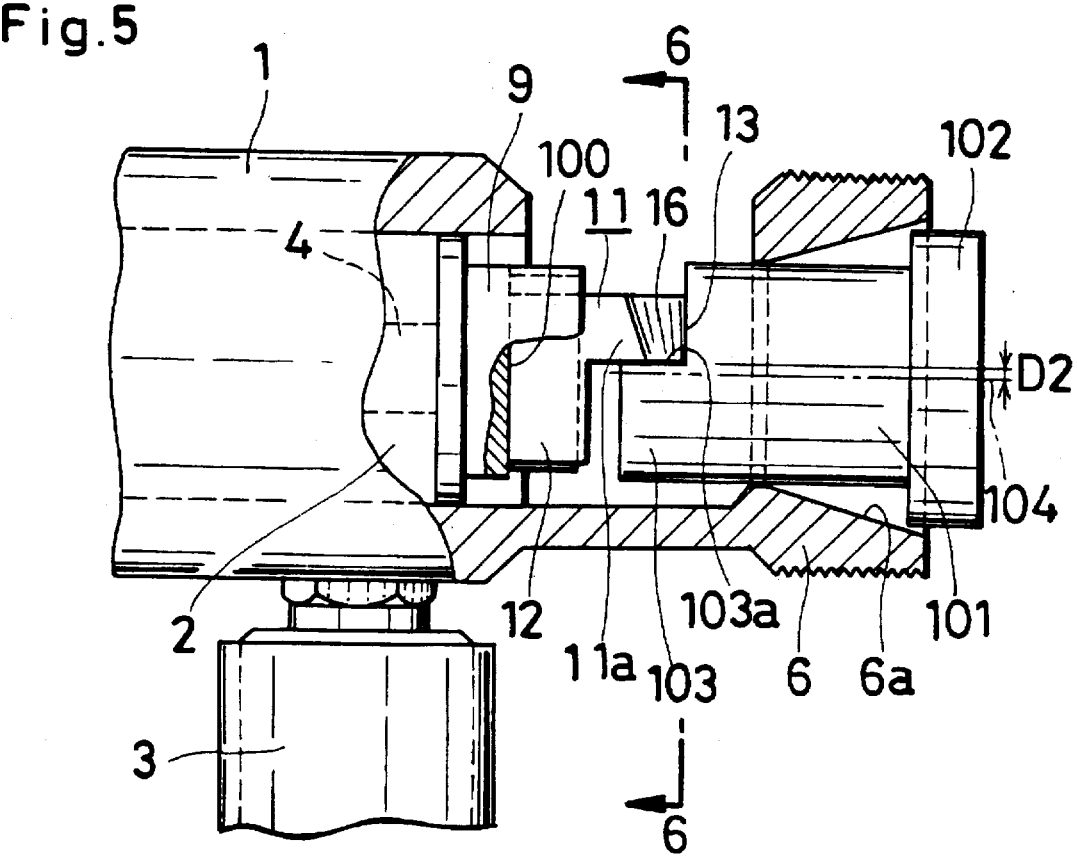
FIG. 5 is a side elevation partly broken away of the tube facing machine to show a cutter positioning jig.
Figure 6:
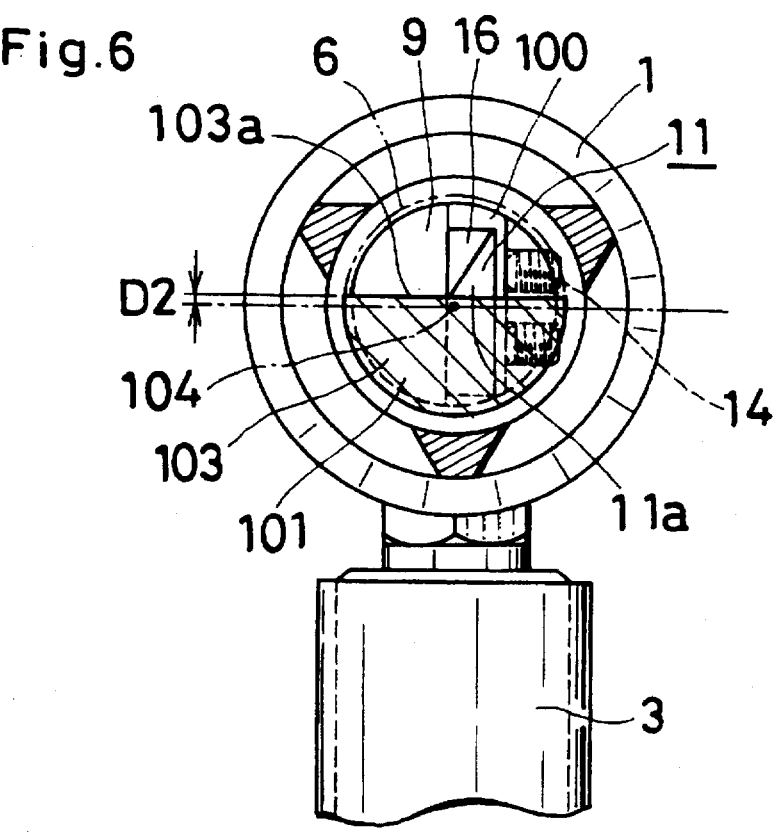
FIG. 6 is a view in section taken along the line 6—6 in FIG. 5.
Figure 7:
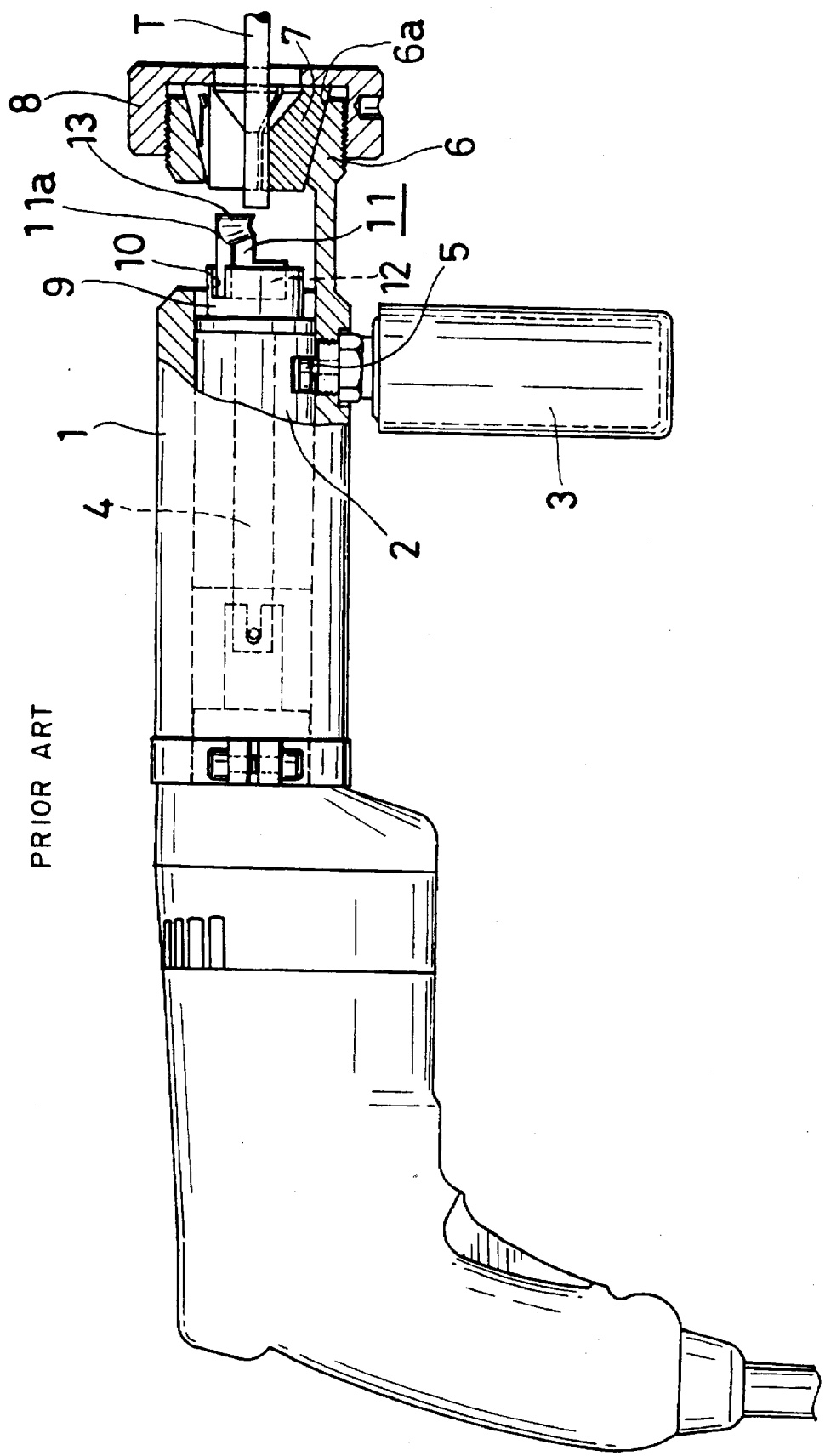
FIG. 7 is a side elevation partly broken away and showing a conventional tube facing machine.

FIGS. 5 and 6 show a cutter positioning jig 101 for use in moving the cutter 11 longitudinally of the cutter mount groove 100. The jig 101 is in the form of a solid cylinder of polyacetal resin having an outside diameter equal to the inside diameter of the fixed ring 6. The jig has at its front end a flange 102 having a slightly smaller diameter than the tapered inner periphery 6a of the fixed ring 6. An approximate half of a solid cylinder slightly smaller than a perfect half thereof is removed from the rear end portion of the jig. The remaining, approximately half solid cylinder portion 103 has a rectangular side surface 103a parallel to the axis 104 of the jig 101 and away from the axis 104 by the specified distance D2. When the cutter positioning jig 101 is inserted into the fixed ring 6 and the cutter 11 is mounted with the cutter prismatic portion 11a in contact with the side surface 103a, the axis 104 of the jig 101 is aligned with the axis 15 of the drive shaft 4, whereby the cutter 11 can be moved longitudinally of the mount groove 100 by the specified distance D2 from the axis 15 of the drive shaft 4. Thus, the use of the jig 101 makes it possible to position the cutting edge 13 as shown in FIG. 4, as shifted by D2 along the length of the groove 100 from the reference position of the drive shaft axis 15.

What is claimed is:

1. A tube facing machine comprising:

a hollow cylindrical body extending longitudinally of said machine;

a cutter rotating drive shaft disposed inside of said body;

a cutter means for facing an end of a tube, wherein said cutter means is attached to a front end portion of said drive shaft;

wherein said front end portion of said drive shaft is formed with a cutter mount groove defined by a reference side face, and said cutter hearts being formed on a base end portion thereof with a reference side face bearing on said reference side face which defines said cutter mount groove, a cutting edge being formed at a front end of said cutter means;

wherein said cutting edge extends from a plane containing said reference side face of said base end portion of said cutter means, and said reference side face which defines said cutter mount groove is positioned a specified distance away from said axis of said drive shaft;

means for holding said tube in front of said cutter means so as to align an axis of said tube with an axis of said drive shaft;

means for moving said drive shaft longitudinally of said machine, wherein said cutter means is fixed so that a cutting direction thereof is a predetermined angle outward with respect to a tangential direction of said tube at a position of cutting; and wherein said predetermined angle between said cutting direction and said tangential direction at said position of cutting is adjustable within a range determined by adjusting said specified distance of said reference side face, defining said cutter mount groove, from said axis of said drive shaft and said predetermined angle is finely adjusted by moving said cutter means longitudinally of said cutter mount groove with said base end portion in bearing contact with said reference side face, defining said cutter mount groove, so that said cutting direction of said cutter means can be readily made to face outwardly by said predetermined angle, even when said tube to be cut for facing is of a small diameter.

2. The tube facing machine as defined in claim 1, wherein said predetermined angle that said cutting direction of said cutter means makes with said tangential direction at said cutting position is 10 to 40 degrees.

3. The tube facing machine as defined in claim 2, wherein said angle that said cutting direction of said cutter means makes with said tangential direction at said cutting position is more preferably between approximately 20 to 30 degrees.

4. The tube facing machine as defined in claim 3, wherein said angle that said cutting direction of said cutter means makes with said tangential direction at said cutting position is most preferably approximately 25 degrees.

* * * * *